United States Patent Office.

EPHRAIM K. SMITH, OF PHILADELPHIA, PENNSYLVANIA.

Letters Patent No. 65,838, dated June 18, 1867.

IMPROVED COMPOSITION FOR MATCHES.

*The Schedule referred to in these Letters Patent and making part of the same.*

TO ALL WHOM IT MAY CONCERN:

Be it known that I, EPHRAIM K. SMITH, of Philadelphia, Pennsylvania, have invented an Improved Composition for Matches; and I do hereby declare the following to be a full, clear, and exact description of the same.

Five pounds of glue are dissolved in sufficient water to form a solution of about the consistency of molasses, and one pound of phosphorus is then dissolved in the solution. Fourteen pounds of red lead are then mixed with eight and one-half pounds of nitric acid, the mixture is added to the solution first made, and the two are thoroughly combined, when the composition may be applied to wooden splints or to tapers in the ordinary manner to form matches.

As this composition is not fulminating in its character, ignited particles are not apt to be discharged from the match when the latter is struck, and the danger of setting fire to adjacent objects is avoided.

Without confining myself to the precise proportions specified, or to the manner described of mixing the ingredients used, I claim as my invention, and desire to secure by Letters Patent, is—

A composition consisting of the materials described for the purpose specified.

In testimony whereof I have signed my name to this specification in the presence of two subscribing witnesses.

EPHRAIM K. SMITH.

Witnesses:
 CHARLES E. FOSTER,
 W. J. R. DELANY.